Oct. 19, 1926.
H. R. McDERMOTT
CONCRETE MIXER
Filed March 8, 1923
1,603,620
2 Sheets-Sheet 1
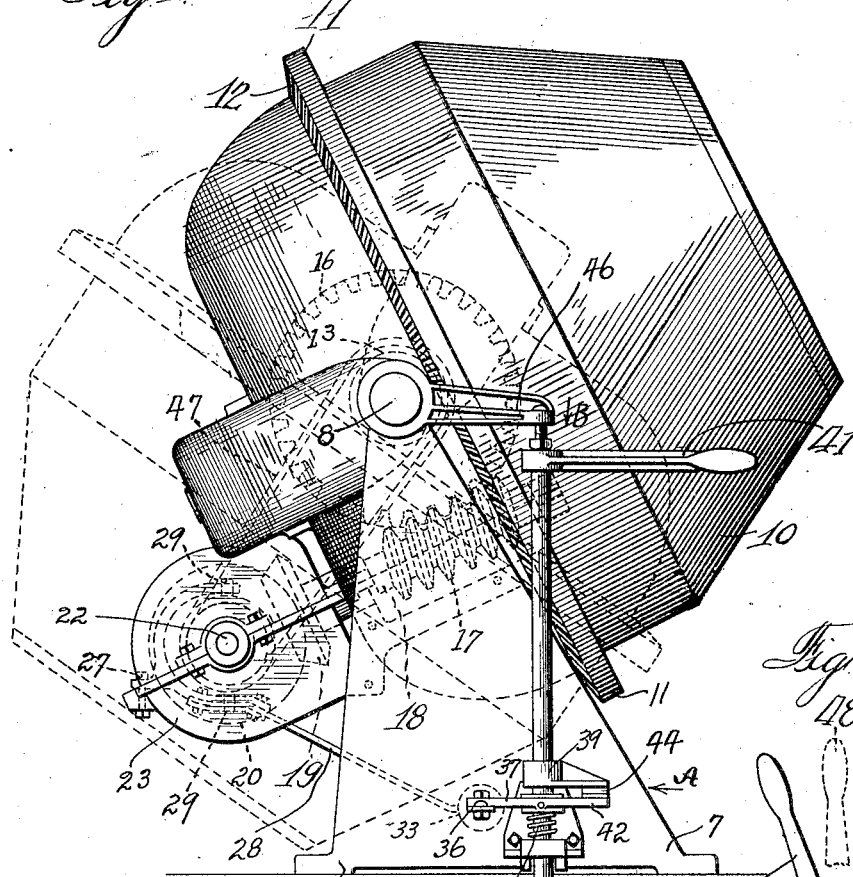
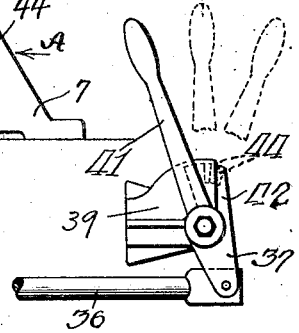
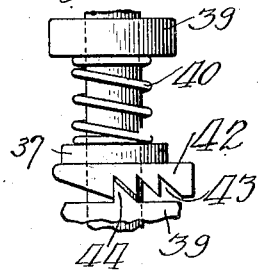
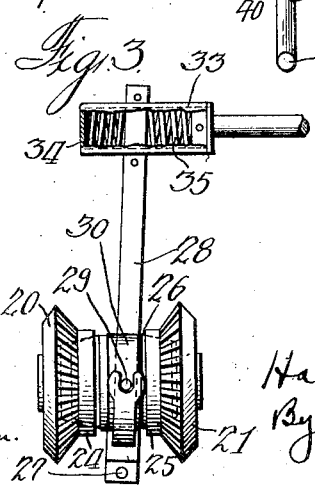
Inventor:
Harold R. McDermott
By Nissen & Crane
Attys.
Witness.
Davs. S. Magnuson.

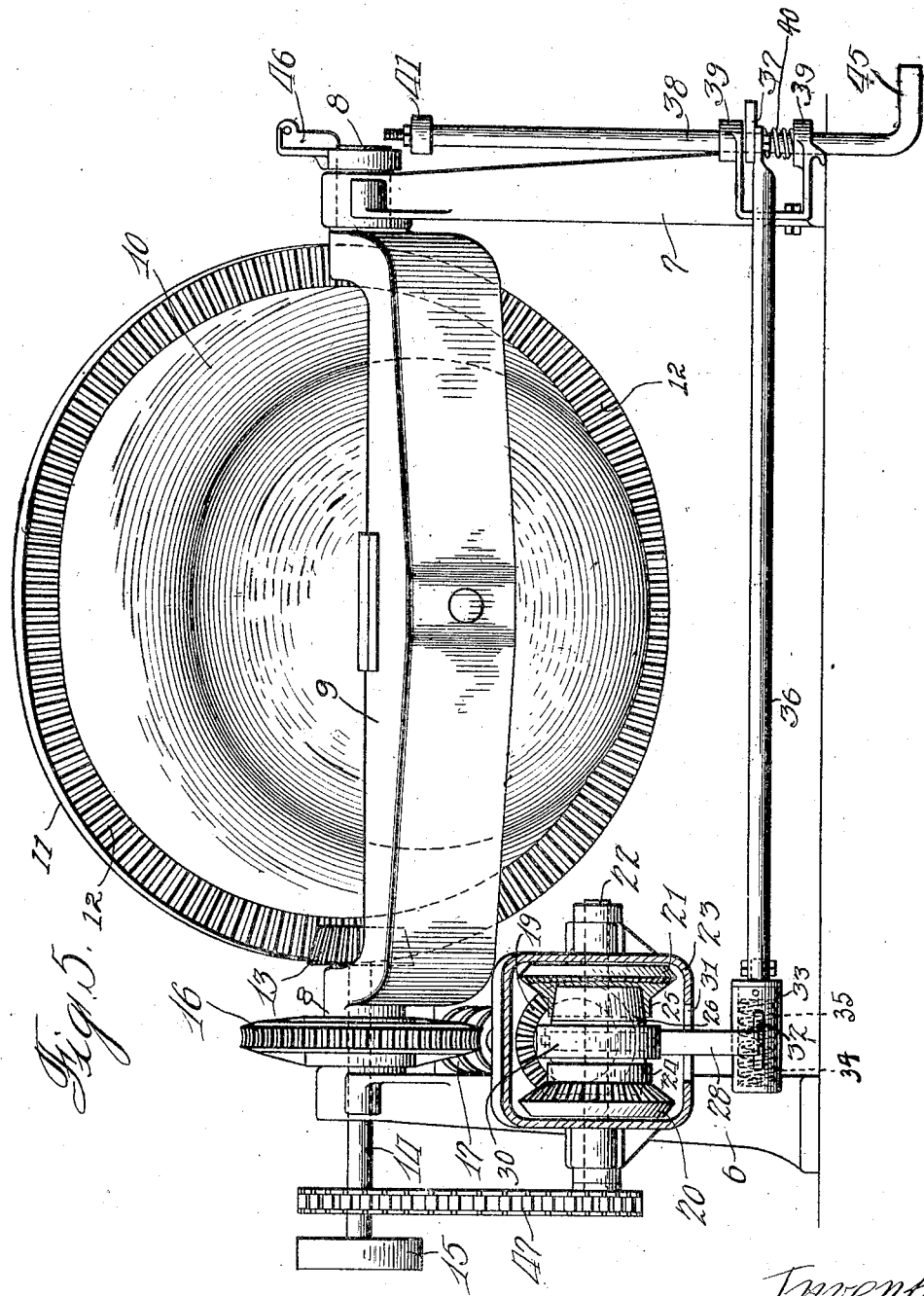

Patented Oct. 19, 1926.

1,603,620

UNITED STATES PATENT OFFICE.

HAROLD R. McDERMOTT, OF WATERLOO, IOWA, ASSIGNOR TO CONSTRUCTION MACHINERY COMPANY, OF WATERLOO, IOWA, A CORPORATION OF IOWA.

CONCRETE MIXER.

Application filed March 8, 1923. Serial No. 623,806.

My invention relates to concrete mixers and has for one of its objects the provision of simple and efficient means in a concrete mixer for easily and quickly tilting the mixing drum and moving the latter from mixing to dumping positions, and vice versa.

A further object is the provision of means in a concrete mixer for stopping the movement of the mixing drum either automatically or at will.

A still further object is the provision of means in a concrete mixer for automatically stopping the movement of the mixing drum in desired positions.

Other objects will appear hereinafter.

An embodiment of my invention is illustrated in the accompanying drawing, forming a part of this specification, and in which—

Fig. 1 is a side elevation of a concrete mixer embodying my invention;

Fig. 2 is an enlarged fragmental view, looking in the direction of arrow A in Fig. 1, of an automatic locking device used in the construction;

Fig. 3 is an enlarged detail view of clutch mechanism used in the device;

Fig. 4 is a view of the controlling handle and mounting looking in the direction of arrow B in Fig. 1; and Fig. 5 is a rear elevation of the device shown in Fig. 1.

Referring more particularly to the drawings, I have indicated frames 6 and 7 which may be mounted in any desirable manner for supporting the parts hereinafter mentioned. At the top of the parts 6 and 7 are bearings in which trunnions 8 of a yoke 9 are mounted.

At the middle of the yoke is a mounting upon which the mixing bowl 10 is pivoted. The bowl 10 has a ring 11 fixed thereon and at one side of the ring are gear teeth 12 meshing with a pinion 13 on a shaft 14 which is journaled in one of the trunnions 8. The shaft 14 is provided with a driving gear or pulley 15 for operating the device.

Fixed on one of the trunnions 8 is a worm gear 16 which meshes with a worm 17, and the latter is mounted on a shaft 18 journaled in suitable bearings on frame 6. The shaft 18 also has a beveled gear 19 fixed thereon which is in constant mesh with gears 20 and 21. The gears 20 and 21 are rotatably mounted on a shaft 22 which is journaled in bearings at the ends of a housing 23 on frame 6. A clutch member 24 is provided on gear 20 and a clutch member 25 is provided on gear 21. A clutch 26 is splined on shaft 22 and adapted to alternately engage clutch members 24 and 25 to drive gears 20 and 21.

Pivoted in the housing 23 on a pivotal point 27 is a lever 28 and the latter has portions engaging pins 29 on a collar 30 rotatably mounted on the clutch 26. Movement of lever 28 in one direction engages the clutch member 26 with clutch member 25, and in the other direction engages clutch member 26 with clutch member 24.

The lever 28 extends out through a slot 31 in housing 23 and through a slot 32 in a housing 33. In the housing 33 are two springs 34 and 35 which engage opposite sides of said lever 28, see Figs. 3 and 5. A rod 36 is connected with the housing 33 so as to operate lever 28. The rod 36 is pivoted to a lever 37 fixed on a shaft 38 which extends vertically in bearings on frame 7, as clearly indicated in Fig. 5. The bearings of shaft 38 are in the form of a yoke 39 with the lever 37 mounted between the parts of the yoke. A spring 40 presses against the lever 37, pressing the latter upwardly against one of the bearings of said yoke. At the top of shaft 38 is a handle 41 by which the operator moves lever 37, rod 36, and housing 33 to operate lever 28.

The lever 37 is preferably provided with an extension 42 which has notches 43 therein adapted to engage a point 44 on the adjacent bearing of yoke 39. The spring 40 holds the point 44 in engagement with one of notches 43 when the hand lever 41 is moved into proper position, as indicated in Fig. 4.

The shaft 38 has a bent portion 45 at its lower end so that the operator can place his foot on said part 45 to press the shaft 28 downwardly to free point 44 from notches 43 when so desired. The trunnion 8 which extends through frame 7 has an arm 46 thereon adapted to engage the upper end of shaft 38 or a projection on the latter so as to move the shaft 38 downwardly to free point 44 from notches 43 when the mixing drum 10 reaches a desired position.

In operation, power is transmitted through pulley 15, shaft 14, pinion 13, and gear teeth 12 to the mixing drum to rotate it on its axis on yoke 9. Chain gearing 47 or any other desirable connection may be arranged between shafts 14 and 22 for rotating the latter. Shaft 22 is therefore rotated continuously with shaft 14 during the operation of the device. The clutch member 26 is splined on shaft 22. When the lever 41 is moved outwardly away from the mixing drum 10, lever 37 is moved to force the rod 36 and housing 33 to compress spring 35 against lever 28. This moves the clutch member 26 into engagement with clutch member 24, causing gear 20 to be driven, and the latter drives the gear 19 and worm 17 for rotating gear 16 and the yoke 9 to tip the mixing drum 10, swinging the latter from its full line to the dotted line position of Fig. 1. The full line position of Fig. 1 is the mixing position, and the dotted line position is the emptying or dumping position of said mixing drum. When the mixing drum reaches the dotted line position of Fig. 1, the operator releases pressure on lever 41, which causes spring 35 to exert its force on lever 28 to bring the clutch member 26 to its neutral position. When the operator moves lever 41 to its full line position of Fig. 4, the housing 33 is moved to compress spring 34 and moves lever 28 to bring clutch member 26 into operative engagement with clutch member 25 and causes gear 21 to move gear 19, and through the worm and worm gear rotates the yoke and mixing drum on the trunnions 8 back to the full line position of Fig. 1. When the latter position of the mixing drum is reached the arm 46 engages the upper end of shaft 38 and moves the latter downwardly, disengaging the point 44 from the notches 43, when the springs 34 and 35 will restore the clutch member 26 to its neutral position and the lever 41 to its position indicated at 48 in Fig. 4. Should the operator desire to stop the mixing drum 10 before it reaches its full line position of Fig. 1, he steps on part 45 of shaft 38 moving the shaft downwardly by disconnecting point 44 from notches 43 which permits springs 34 and 35 to move lever 28 and clutch member 26 to normal or inoperative position and thereby stopping the rotation of the mixing drum on said trunnions.

I claim:—

1. A concrete mixer comprising a pivotally mounted mixing-bowl, gearing for rotating said mixing-bowl from a mixing position to a dumping position and for returning said mixing-bowl to a predetermined mixing position thereafter, tripping mechanism comprising a rod having inter-locking toothed members thereon for disengaging said gearing when said mixing-bowl is in a predetermined position.

2. A concrete mixer comprising a pivotally mounted mixing-bowl, gearing for rotating said mixing-bowl from a mixing position to a discharging position and for returning the same to a mixing position thereafter, mechanism for disengaging said gearing comprising a resiliently held rod, and trip mechanism for releasing said resiliently held rod when said mixing-bowl is in a predetermined position.

3. A concrete mixer comprising a pivotally mounted mixing-bowl, gearing for moving said mixing-bowl from a mixing position to a discharging position and for returning the same to a mixing position thereafter, mechanism for disengaging said gearing comprising a spring pressed rod, tripping mechanism for automatically releasing said spring pressed rod when said mixing-bowl is in a predetermined position, and manually operable means for releasing said rod to disengage said gearing at the will of the operator.

4. A concrete mixer comprising a pivotally and rotatively mounted mixing-bowl, driving mechanism for continuously rotating said mixing-bowl, gearing connected with said driving mechanism for tipping said mixing-bowl to discharge the contents thereof and for returning said mixing-bowl to a predetermined mixing position, means for disengaging said gearing from said driving mechanism comprising a spring pressed lever and a pair of interlocking members, and tripping mechanism for separating said interlocking mechanism to release said spring pressed rod for operating said disengaging mechanism when said mixing-bowl is in a predetermined mixing position.

5. A concrete mixer comprising a pivotally mounted mixing-bowl, driving means for oscillating said mixing-bowl from a mixing position to a discharging position and for returning the latter to a mixing position thereafter, mechanism for disengaging said driving means comprising a rod having a spring at one end and toothed interlocking members at the other, said spring being adapted to move said rod when said toothed interlocking members are separated for disengaging said driving mechanism, and tripping mechanism for automatically releasing said interlocking members to permit movement of said rod when said mixing-bowl is in a predetermined position.

6. A concrete mixer comprising a pivotally mounted mixing-bowl, driving means for oscillating said mixing-bowl from a mixing position to a discharging position and for returning said mixing-bowl to a mixing position thereafter, mechanism for disengaging said driving means comprising a rod having a spring at one end and toothed interlocking members at the other, said spring being adapted to move said rod when said toothed interlocking means are separated to disengage said driving mechanism, tripping mechanism for automatically releasing said interlocking members to cause movement of said rod when said mixing-bowl is in a predetermined position, and manually operable means for releasing said rod to disengage said driving mechanism at the will of the operator.

7. A concrete mixer comprising a pivotally mounted mixing-bowl, gearing for moving said bowl about its pivot, mechanism including a clutch for driving said gearing, an operating rod for said clutch, a catch for said rod to retain said clutch in operative position, a spring interposed between said rod and said catch to exert resilient force on said clutch and catch, and means actuated by said mixing-bowl when it reaches a predetermined position for tripping said catch to release said clutch and stop the movement of said mixing-bowl.

8. A concrete mixer comprising a pivotally mounted mixing-bowl, gearing for moving said bowl about its pivot, mechanism including a clutch for driving said gearing, an operating rod for said clutch, a catch for said rod to retain said clutch in operative position, a spring interposed between said rod and said catch to exert resilient force on said clutch and catch, means operated by said mixing-bowl when it reaches a predetermined position for tripping said catch to release said clutch and stop the movement of said mixing-bowl, and manually operable means for releasing said catch to stop the movement of said bowl at the will of the operator.

9. A concrete mixer comprising a pivotally and rotatively mounted mixing-bowl, driving mechanism for continuously rotating said bowl, gearing for moving said bowl about its pivot, mechanism including a clutch for driving said gearing, an operating rod for said clutch, a catch for said rod to retain said clutch in operative position, a spring connected with said rod to exert resilient force on said clutch and catch, and tripping means operable by said mixing-bowl when it reaches a predetermined position to release said catch and permit said rod to be moved by said spring to stop the movement of said bowl.

In testimony whereof I have signed my name to this specification on this 5th day of March, A. D. 1923.

HAROLD R. McDERMOTT.